(12) United States Patent
Lawson

(10) Patent No.: US 7,021,675 B2
(45) Date of Patent: Apr. 4, 2006

(54) SWIVEL ASSEMBLY

(75) Inventor: G. Ronald Lawson, Plant City, FL (US)

(73) Assignee: Florida Plating & Machining, Inc., Bartow, FL (US)

( * ) Notice: Subject to any disclaimer, the term of this patent is extended or adjusted under 35 U.S.C. 154(b) by 14 days.

(21) Appl. No.: 10/442,478

(22) Filed: May 21, 2003

(65) Prior Publication Data

US 2004/0232692 A1    Nov. 25, 2004

(51) Int. Cl.
*F16L 27/00* (2006.01)
(52) U.S. Cl. .................................. 285/281; 285/275
(58) Field of Classification Search ............... 285/272, 285/273, 275, 278, 280, 281
See application file for complete search history.

(56) References Cited

U.S. PATENT DOCUMENTS

| | | | | |
|---|---|---|---|---|
| 2,698,664 A | * | 1/1955 | Freeman | 169/25 |
| 2,833,566 A | * | 5/1958 | Meyer et al. | 285/18 |
| 2,986,344 A | * | 5/1961 | Knight | 239/587.2 |
| 3,309,114 A | * | 3/1967 | Morton | 285/11 |
| 3,567,256 A | * | 3/1971 | Haley | 285/119 |
| 4,620,728 A | * | 11/1986 | Barth et al. | 285/14 |
| 4,944,535 A | * | 7/1990 | Maupin | 285/16 |
| 5,782,504 A | * | 7/1998 | Chauncey | 285/147.3 |
| 5,851,034 A | * | 12/1998 | Shah | 285/16 |
| 6,007,105 A | * | 12/1999 | Dietle et al. | 285/94 |
| 6,386,595 B1 | * | 5/2002 | Peppel | 285/281 |

FOREIGN PATENT DOCUMENTS

GB    2195726    *    4/1988    ................. 285/281

* cited by examiner

*Primary Examiner*—David Bochna
(74) *Attorney, Agent, or Firm*—Arthur W. Fisher, III

(57) ABSTRACT

A swivel assembly for use with a water gun mounted on a base or coupled to a water supply conduit to discharge a high velocity stream of water into a mineral stockpile and slurry pit, the swivel assembly comprises a stationary swivel section and a rotatably swivel section configured and disposed to operatively support a bearing including a stationary bearing section and a rotatable bearing section therebetween to facilitate rotation of the water gun relative to the base or the water supply conduit to selectively control the direction of the high velocity stream of water relative to the mineral stockpile.

20 Claims, 6 Drawing Sheets

SWIVEL ASSEMBLY

BACKGROUND OF THE INVENTION

1. Field of the Invention

A swivel assembly for use with a water gun to discharge a high velocity stream of water into a mineral stockpile.

2. Description of the Prior Art

U.S. Pat. No. 4,949,794 shows a control apparatus including means to position and move the controlled apparatus having a fluid discharge device for vertical and horizontal movement. The control apparatus comprises a control input, a joystick, a controlled apparatus position limit, and a switch for selecting manual and automatic position and movement; a computer, a memory for storing program, a device for receiving controlled apparatus position information and a device for generating and communicating electrical signals; first and second controlled apparatus position determining devices; first and second control remotely controlled electrically operating drive motors for adjusting and controlling movement to the controlled apparatus, and first and second current sensing devices interposed between said computer and the drive motors.

U.S. Pat. No. 4,708,395 teaches a method and apparatus for mining a location using a hydraulic monitor having a horizontal and vertical positionable control apparatus. The hydraulic monitor is connected to a source of high pressure water. Distance and direction measuring equipment are mounted on the monitor and controlled in a manner to scan the location. The output from the distance and direction measuring equipment is fed to a computer and a visual video display monitor. The computer converts the information from the distance and direction measuring equipment to a visual representation of the cavity being mined.

U.S. Pat. No. 4,045,086 shows a method and apparatus for hydraulic mining wherein the mined product is reduced to a pumpable form. The apparatus includes a jet monitor for dislodging the mined product from its in situ state, a feeder-breaker for receiving the mined product, preliminarily separating the pumpable constituent of the product and then subjecting the remaining product to successive breaking and separating steps until the entire product is in a pumpable state. The feeder-breaker is also provided with a sump to collect the pumpable product and pump means to convey the product from the sump under pressure, whereby transport of the product is not dependent on gravity. In the preferred embodiment, the feeder-breaker is provided with a secondary jet monitor to reduce oversized constituents of the mined product to a size suited for the successive separating and breaking steps.

U.S. Pat. No. 3,639,003 comprises a high-pressure stream of leach solution directed against a mine waste dump or other mass of mineral-bearing material to be leached to dislodge and break up the material.

U.S. Pat. No. 2,998,199 discloses a hydraulic monitors of the type used in mining and fire fighting to utilize the reaction force of liquid discharge of the liquid about two angularly related axes including an eccentric swivel joint comprising a sleeve having a bore, a tubular eccentric having a bore concentric with the sleeve bore journalled on the sleeve for rotation about an axis coinciding with the axis of the sleeve and having an outer cylindrical surface eccentric with respect to the sleeve and the bores, a housing having a sleeve portion journalled on the cylindrical surface, a tubular member secured to the housing concentrically with respect to the cylindrical surface and having a bore eccentric to the bores of the sleeve and the eccentric, means providing a liquid tight seal between the sleeve and the tubular eccentric and between the tubular eccentric and the housing, and means for freely rotating the tubular eccentric and the housing independently of each other while maintaining their axial disposition and the liquid tight seal therebetween, and bearings interposed between the sleeve and the tubular eccentric and between the cylindrical surface and the sleeve portion of the housing.

U.S. Pat. No. 740,731 teaches an apparatus for mining phosphatic pebble comprising a station to wash and clean the material and a pump and motor therefor for elevating the material thereto. A pipe extends from the pump to the sump. The auxiliary pump having an independent motor. The auxiliary pump is coupled with the pipe and intermediate the first-named pump and the sump end of the pipe arranged in a plane considerably below that of the pump in the upper plane.

SUMMARY OF THE INVENTION

The present invention relates to a swivel assembly for use with a water gun mounted on a base to discharge a high velocity stream of water into a miner stockpile and slurry pit.

Transporting a colloidal like mixture of phosphate or other mineral materials suspended in water from a mining site to a processing facility through a pipeline. Mineral materials are mechanically extracted from the ground by a dragline or other excavating equipment and deposited in a stockpile adjacent to a slurry pit near the mining area. The mineral materials in the stockpile are then washed into the slurry pit by complementary high velocity streams of water discharged by water guns positioned on opposing sides of the slurry pit. Once in the slurry pit, the mineral materials are mixed with water discharged from the opposing water guns to form a colloidal like water-mineral matrix that flows by gravity through a crushing grid to a hydraulic pump inlet disposed within the slurry pit. Of course, a single water gun may be used.

Each water gun can be mounted on a portable sled in operative communication with a water supply conduit. The sled can be selectively positioned adjacent to the slurry pit by wheel loaders or track-mounted heavy equipment typically used in mining operations. Each water gun includes a barrel moveable through a selectable range of vertical and horizontal motion sufficient to allow water discharged from the outlet thereof to be directed against the stockpile of mineral material, the surface of the slurry pit and the crushing grid surrounding the hydraulic pump inlet. Movement of each water gun barrel is accomplished by a corresponding vertical positioning device and a horizontal positioning device. The vertical positioning device and the horizontal positioning device each may comprise a hydraulic system, gear drive train or other suitable positioning means.

The swivel assembly comprises a stationary swivel section and a rotatably swivel section configured and disposed to operatively support a bearing therebetween. The bearing comprising a stationary bearing section and a rotatable bearing section facilitates rotation or movement of the water gun to selectively control the direction of the high velocity stream of water relative to the mineral stockpile and slurry pit.

The stationary swivel section comprises a stationary swivel member including an inner and outer surface having a centrally disposed channel formed therethrough to operatively receive and support an inner portion of a substantially cylindrical water conduit sleeve therein. A substantially annular recess having a bearing support surface is formed on the inner surface of the stationary swivel section to receive and support a portion of the rotatable bearing section therein. A plurality of fastener recesses are formed on the outer surface of the stationary swivel member to secure the stationary swivel section to the base of the water gun or the water supply conduit.

The rotatable swivel section comprises a rotatable swivel member including an inner and outer surface having a centrally disposed channel including an inner channel surface formed therethrough to operatively receive and support an outer portion of the substantially cylindrical water conduit sleeve therein and at least one seal recess formed in the inner channel surface to operatively receive a corresponding seal therein disposed to engage and seal a portion of the outer surface of the outer portion of the substantially cylindrical water conduit sleeve.

A bearing protrusion extends inwardly from the inner surface of the rotatable swivel section to engage a portion of the rotatable bearing section of the bearing. A plurality fasteners secure a portion of the rotatable bearing section of the bearing to the rotatable swivel section of the swivel assembly and a plurality of fastener secure the rotatable bearing section of the bearing to a portion of the water gun or the water supply conduit on the other side of the bearing from the stationary swivel section.

In operation, mineral material is deposited in a stockpile on the edge of the slurry pit by a dragline or excavating equipment. Streams of high velocity water discharged from the barrels of the water guns are periodically directed to the base of the stockpile thereby causing mineral material on the edge of the stockpile to slough off into the slurry pit. By rotating the rotatable swivel sections and the corresponding rotatable bearing sections in the vertical and/or horizontal direction relative to the corresponding stationary swivel sections and the stationary bearing sections, an operator can control the motion of the barrel of the water guns to modulate the high velocity stream or liquid or water to slough off of the stockpile and into the slurry pit.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and object of the invention, reference should be had to the following detailed description taken in connection with the accompanying drawings in which.

Similar reference characters refer to similar parts throughout the several views of the drawings.

DETAILED DESCRIPTION OF THE INVENTION

The present invention relates to a swivel assembly for use with a water gun mounted on a base or a water supply conduit to discharge a high velocity stream of water into a mineral stockpile and slurry pit to transport colloidal like mixture of phosphate or other mineral materials suspended in water from a mining site to a processing facility through a pipeline.

Figure 1:
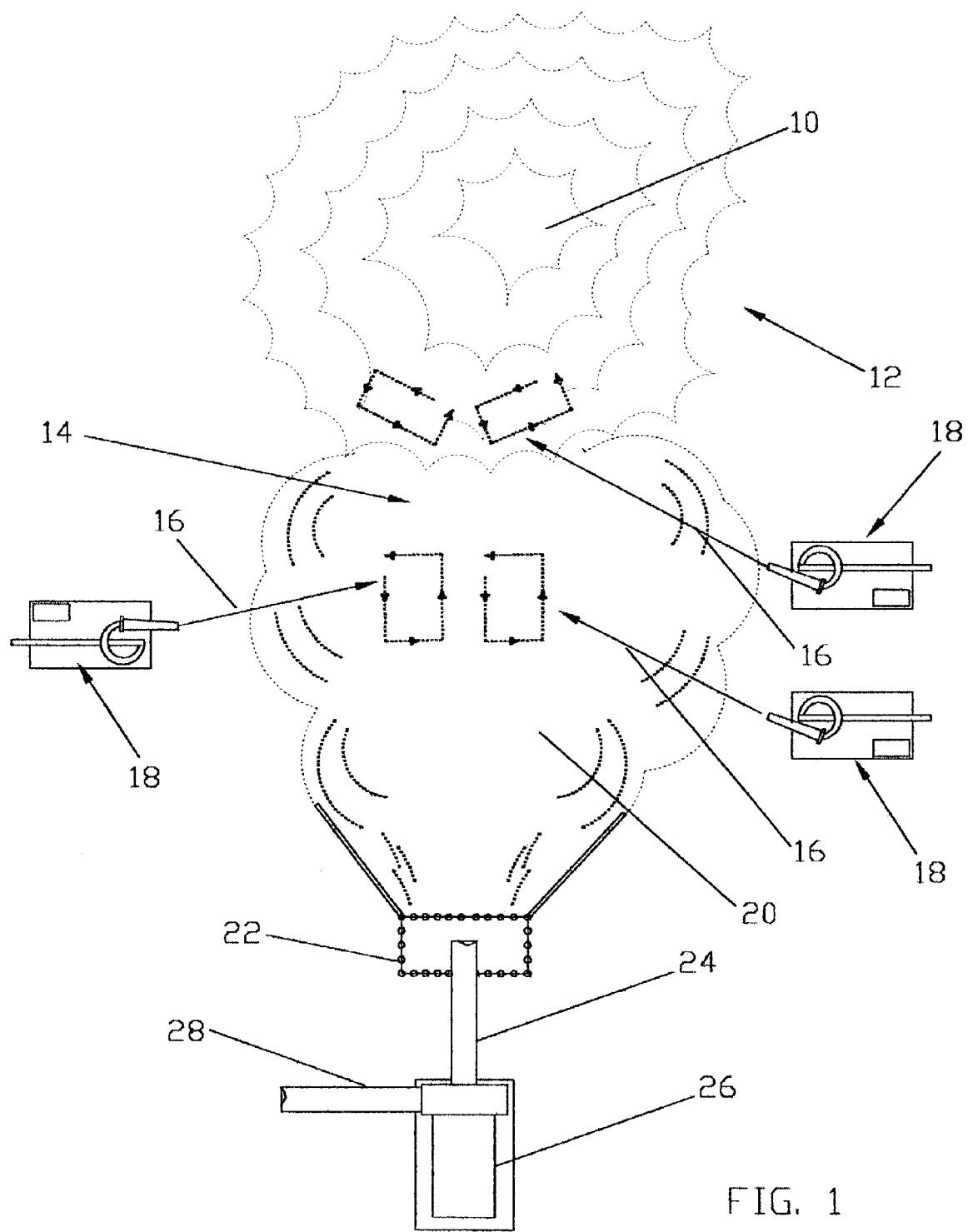
FIG. 1 is a top view of an arrangement of water guns including swivel assemblies of the present invention with a dry mineral stockpile and a slurry pit.

As shown in FIG. 1, mineral materials 10 are mechanically extracted from the ground by a dragline or other excavating equipment (not shown) and deposited in a dry mineral stockpile generally indicated as 12 adjacent to a slurry pit generally indicated as 14 formed in the ground in or adjacent to the mining area. The mineral materials 10 in the dry mineral stockpile 12 are washed into the slurry pit 14 by high velocity streams of water 16 discharged by water guns each generally indicated as 18 positioned on opposite sides of the slurry pit 14. Once in the slurry pit 14, the mineral materials 10 are mixed with water discharged from the water guns 18 against the slurry surface to form a colloidal like water-mineral mixture 20 that flows by gravity through a crushing grid 22 to a hydraulic pump inlet conduit 24 disposed within the slurry pit 14. The colloidal like water-mineral mixture 20 is drawn through the hydraulic pump inlet conduit 24 into a water-mineral mixture pump 26 and fed through a mixture supply conduit 28 to the processing facility (not shown).

Figure 2:
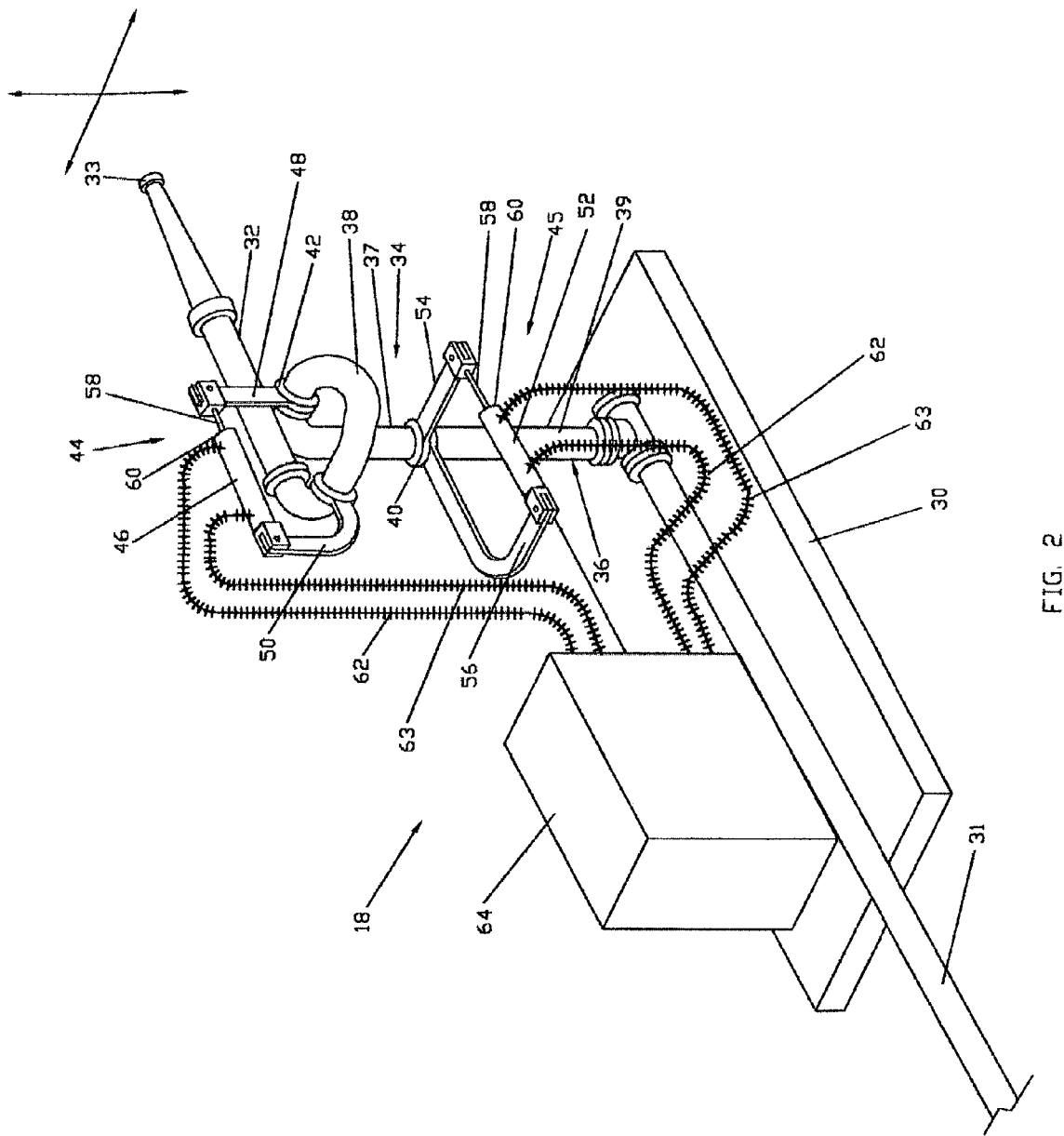
FIG. 2 is a perspective view of a water gun including swivel assemblies of the present invention.

As shown in FIG. 2, each water gun 18 can be in operative communication with a corresponding water supply conduit 31 mounted on a portable sled 30. The portable sled 30 can be selectively positioned adjacent to the slurry pit 14 by wheel loaders or rack-mounted heavy equipment typically used in mining operations (not shown). Each water gun 18 includes a water gun barrel 32 with a high pressure discharge nozzle 33 formed on an articulated supply pipe generally indicated as 34 comprising a straight substantially vertical supply tube generally indicated as 36 including an upper or first supply tube section 37 and a lower or second supply tube section 39 and a substantially horizontal curvilinear supply tube 38.

A first water-tight swivel assembly 40 is formed between the upper or first supply tube section 37 and the lower or second supply tube section 39 of the straight substantially vertical supply tube 36 and a second water-tight swivel assembly 42 is formed in the substantially horizontal curvilinear supply tube 38.

Through selective movement of the first water-tight swivel assembly 40 and the second water-tight swivel swivel assembly 42, the water gun barrel 32 is moveable through a range of vertical and horizontal motion by a positioning device comprising a first positioning mechanism generally indicated as 44 and a second positioning mechanism generally indicated as 45 sufficient to allow water discharged from the high pressure discharge nozzle 33 to be directed against the dry mineral stockpile 12, the surface of the slurry pit 14 and the crushing grid 22 surrounding the hydraulic pump inlet conduit 24.

Vertical movement of each water gun barrel 32 is accomplished by the vertical or first positioning mechanism 44 comprising a first positioning assembly generally indicated as 46 operatively coupled between a first vertical control arm 48 rigidly attached to the substantially horizontal curvilinear supply tube 38 on one side of the second water-tight swivel assembly 42 and a second vertical control arm 50 rigidly coupled to the substantially horizontal curvilinear supply tube 38 on the other side of the second water-tight swivel assembly 42.

Horizontal movement of each water gun barrel 32 is accomplished by the horizontal or second positioning mechanism 45 comprising a second positioning assembly generally indicated as 52 operatively coupled between a first horizontal control arm 54 rigidly attached to the first supply tube section 37 on one side of the first water-tight swivel assembly 40 and a second horizontal control arm 56 rigidly attached to the supply tube section 39 on the other side of the first water-tight swivel assembly 40.

Each positioning assembly 46 or 52 comprises a first element or connecting rod 58 and a second element or hydraulic cylinder 60 movably coupled to each other and to the corresponding first and second vertical control assembly 48 and 50, and the corresponding first and second horizontal control arms 54 and 56 respectively.

Operation of the vertical positioning mechanism 44 and horizontal positioning mechanism 45 involves the selective introduction of high pressure hydraulic fluid to the corresponding hydraulic cylinder 60 extending or retracting the corresponding connecting rod 58. Hydraulic fluid is circulated through the corresponding hydraulic cylinder 60 by a supply conduit 62 and a return conduit 63 in operative communication with the corresponding hydraulic cylinder 60 and hydraulic pump (not shown) disposed within a cabinet 64 mounted on the portable sled 30. The hydraulic pump (not shown) is powered by an electric motor (not shown) also disposed within the cabinet 64. Electromechanical valves (not shown) common in the art are disposed between the supply conduit 62 and the return conduit 63 and the hydraulic pump (not shown) to control the flow of hydraulic fluid to and from the corresponding hydraulic cylinder 60.

While the positioning assemblies 46 and 52 shown comprise hydraulic mechanisms, a gear drive train or other suitable positioning means may be employed to selectively move or position the water gun barrels 32 and corresponding high pressure discharge nozzles 33.

Figure 3:
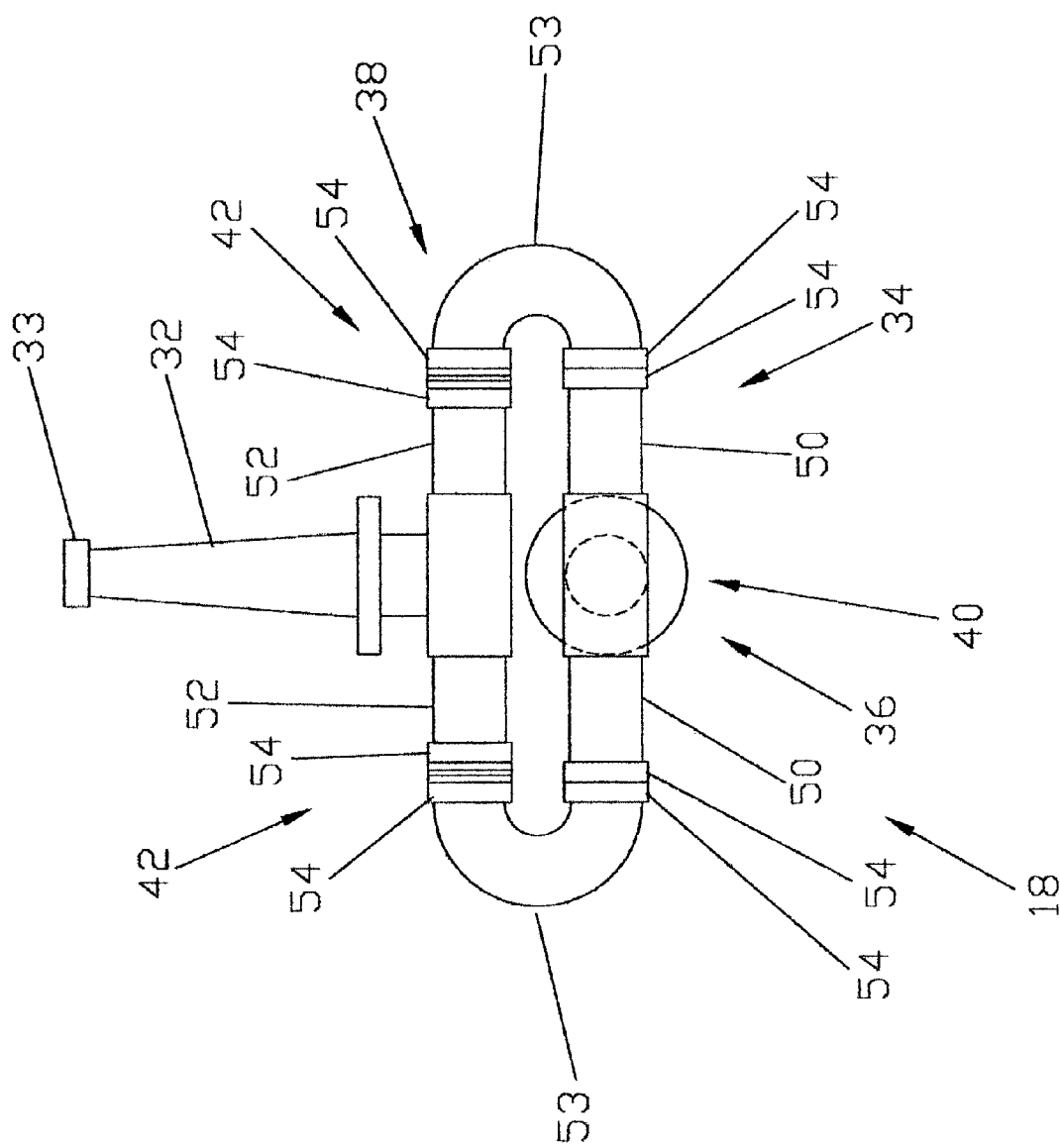
FIG. 3 is a top view of an alternate embodiment of a water gun including swivel assemblies of the present invention.
Figure 4:
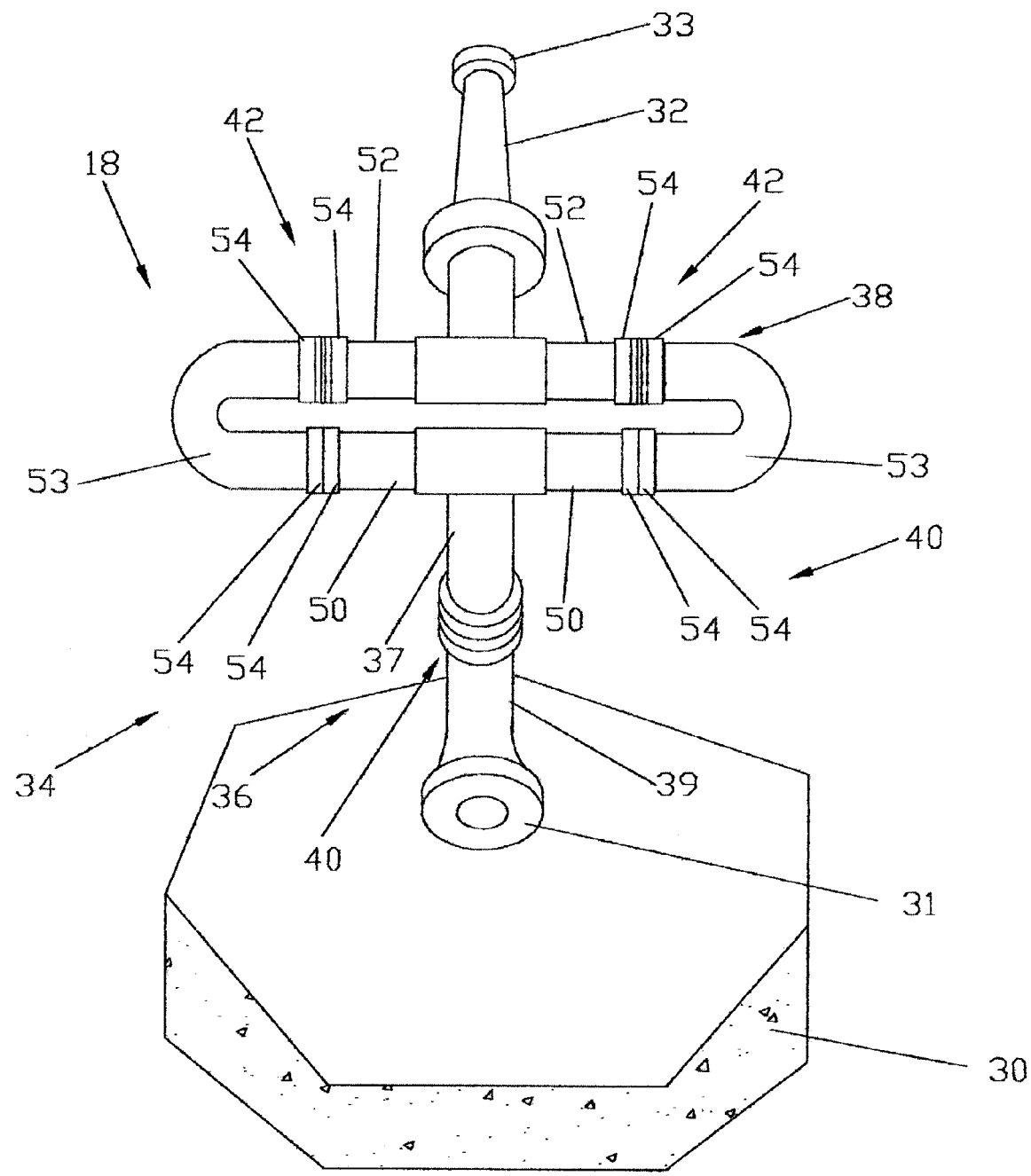
FIG. 4 is a rear view of the water gun including swivel assemblies of the present invention shown in FIG. 3.

FIGS. 3 and 4 show partial views of an alternate embodiment of the water gun 18. Specifically, the water gun 18 includes a water gun barrel 32 with a high pressure discharge nozzle 33 formed on an articulated supply pipe generally indicated as 34. The articulated supply pipe 34 comprises a straight substantially vertical supply tube assembly generally indicated as 36 including an upper or first supply tube section 37 and a lower or second supply tube section 39 coupled to opposite sides of a first water-tight swivel assembly generally indicated as 40 and a substantially horizontal curvilinear supply tube generally indicated as 38 including a first and second straight supply tube sections including segments 50 and 52 respectively coupled to a pair of curved end supply tube sections each indicated as 53 by corresponding flanges 54 and a pair of second water-tight swivel assemblies each generally indicated as 42 coupled between corresponding flanges 54 on the forward portion of the water gun 18.

More specifically, the first water-tight swivel assembly 40 is disposed or operatively coupled between the upper or first supply tube section 37 and the lower or second supply tube section 39 of the straight substantially vertical supply tube 36 and each second water-tight swivel assembly 42 is disposed or operatively coupled between the corresponding second straight supply tube segment 52 and the corresponding curved and supply tube section 53 by corresponding flanges 54.

Through selective movement of the first water-tight swivel assembly 40 and the second water-tight swivel swivel assemblies 42, the water gun barrel 32 is moveable through a range of vertical and horizontal motion by a positioning device comprising a first positioning mechanism and a second positioning mechanism (not shown) sufficient to allow water discharged from the high pressure discharge nozzle 33 to be directed against the dry mineral stockpile 12, the surface of the slurry pit 14 and the crushing grid 22 surrounding the hydraulic pump inlet conduit 24. The positioning device may comprise any suitable hydraulic, electrical, gear drive train or other suitable positioning mechanism.

Figure 5:
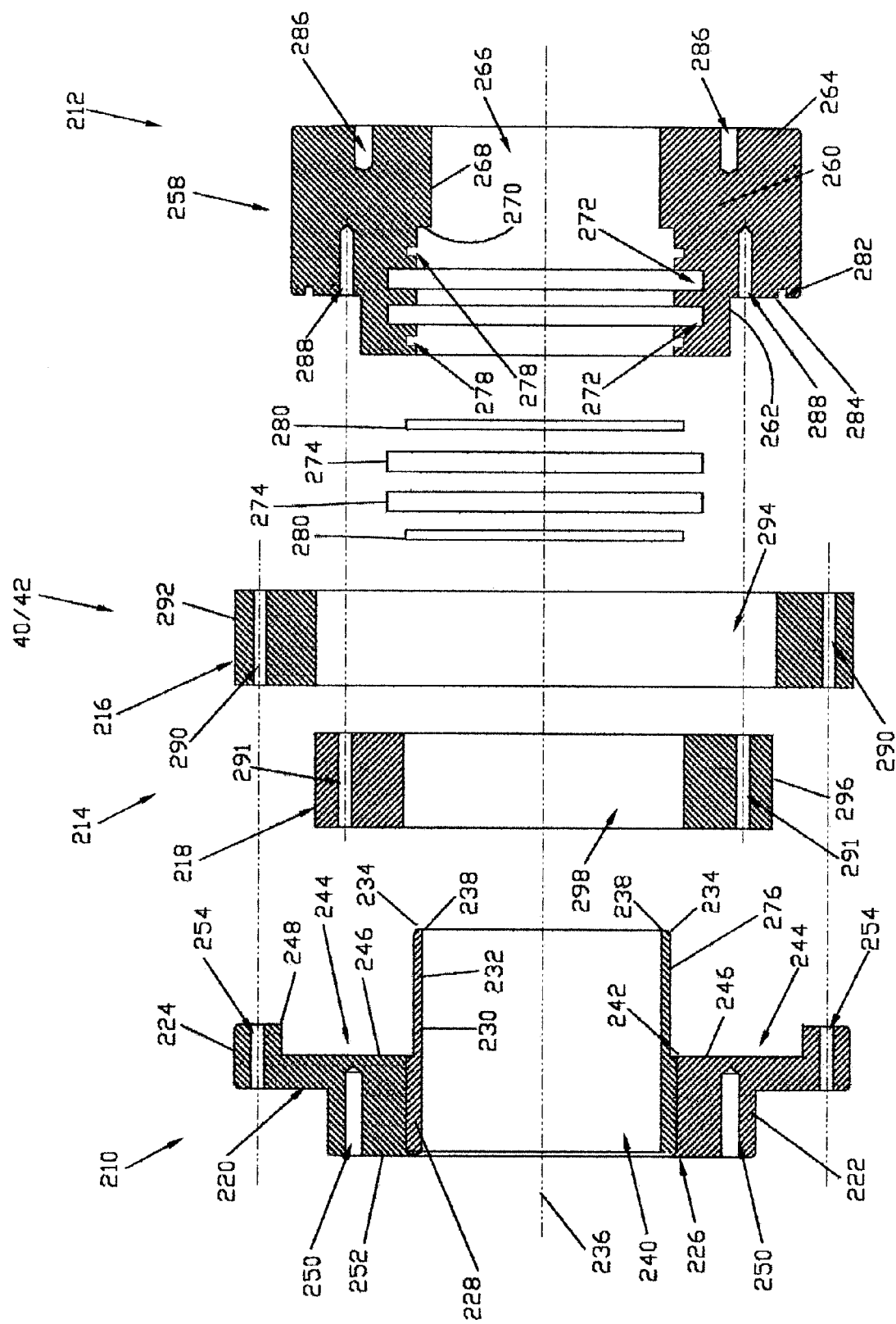
FIG. 5 is an exploded side view of a swivel assembly of the present invention.

FIG. 5 shows the details of the swivel assemblies 40 and 42 which are similarly constructed. Specifically, each swivel assembly 40 and 42 comprises a stationary swivel section generally indicated as 210 and a rotatable swivel section generally indicated as 212 configured and disposed to operatively support a bearing generally indicated as 214 comprising an outer stationary bearing section generally indicated as 216 and an inner rotatable bearing section generally indicated as 218 therebetween.

The stationary swivel section 210 comprises a stationary swivel member generally indicated as 220 including an outer body 222 and an inner flange 224 having a centrally disposed sleeve channel 226 formed therethrough to operatively receive and support an interior portion or segment 228 of a substantially cylindrical water conduit sleeve 230 therein. The exterior portion or segment 232 of the substantially cylindrical water conduit sleeve 230 includes a outer beveled end portion 234 inclined inwardly toward the center-line 236 of the substantially cylindrical water conduit sleeve 230 at about a five (5°) degree angle to form a leading edge 238. A conduit channel 240 is formed through the substantially cylindrical water conduit sleeve 230 that is dimensional to pass through the bearing 214 and into the rotatable swivel section 210 as described hereinafter. The wall thickness of the interior portion or segment 228 of the substantially cylindrical water conduit sleeve 230 is greater than the wall thickness of the exterior portion or segment 232 of the substantially cylindrical water conduit sleeve 230 forming a circular shoulder 242 at the intersection thereof. The substantially cylindrical water conduit sleeve 230 is constructed of stainless steel secured to the stationary swivel member 220 constructed of cast iron.

A substantially annular bearing recess 244 having substantially annular bearing support surface 246 is formed on the inner surface 248 of the inner flange 224 of the stationary swivel member 220 to receive and support a portion of the rotatable bearing section 218. A plurality of fastener recesses each indicated as 250 is formed in the outer surface 252 of the outer body 222 of the stationary swivel member 220 to receive a corresponding plurality of fasteners (not shown) therein to secure the stationary swivel section 210 to the base or water supply conduit. A plurality of fastener channels each indicated as 254 is formed through the inner flange 224 of the stationary swivel member 220 to receive a corresponding plurality of fasteners (not shown) therein to secure the stationary swivel section 210 to the stationary bearing section 216 of the bearing 214.

The rotatable swivel section 212 comprises a rotatable swivel member generally indicated as 258 including a rotatable body 260 having a reduced inner substantially cylindrical protrusion 262 to receive the inner rotatable bearing section 218 thereon and an enlarged outer flange 264 having a centrally disposed channel 266 formed therethrough to receive the outer portion or segment 232 of the substantially cylindrical water conduit sleeve 230 therein. The inner wall 268 of the centrally disposed channel 266 includes a substantially circular shoulder 270 to receive the leading edge 238 of the outer beveled end portion 234 of the exterior portion or segment 232 of the substantially cylindrical water conduit sleeve 230, a pair of circular seal recesses each indicated or 272 to receive and operatively retain a corresponding substantially circular seal 274 to seal against the outer surface 276 of the exterior portion or segment 232 of the substantially cylindrical water conduit sleeve 230, and a pair of O-ring each indicated as 278 to receive and operatively retain a corresponding circular O-ring 280 to seal against the outer surface 276 of the exterior portion or segment 232 of the substantially cylindrical water conduit sleeve 230.

An exterior O-ring groove 282 is formed in the inner surface 284 of the enlarged outer flange 264 to receive a corresponding O-ring (not shown) to seal against the stationary bearing section 216 of the bearing 214 when the swivel assembly 10 is assembled. A plurality of fastener channels or recesses each indicated as 286 is formed through the enlarged outer flange 264 to receive corresponding fasteners therethrough (not shown) to secure the rotatable swivel section 212 to a water supply conduit 37 or 52. Another plurality of fastener channels or recesses each indicated as 288 is formed through the reduced inner protrusion 262 of the rotatable swivel section 212 to receive corresponding fasteners therethrough (not shown).

A plurality of fastener channels each indicated as 290 is formed in stationary bearing section 216 of the bearing 214 to align with the plurality of fastener channels 254 formed through the inner flange 224 of the stationary swivel member 220 to secure the stationary swivel section 210 and the stationary bearing section 216 Another plurality of fastener channels each indicated as 291 is formed in the rotatable bearing section 216 of the bearing 214 to align with the plurality of fastener recesses or channels 288 formed in the enlarged outer flange 264 of the rotatable swivel member 258 to secure the rotatable swivel section 212 and the rotatable bearing section 218 together.

Figure 6:
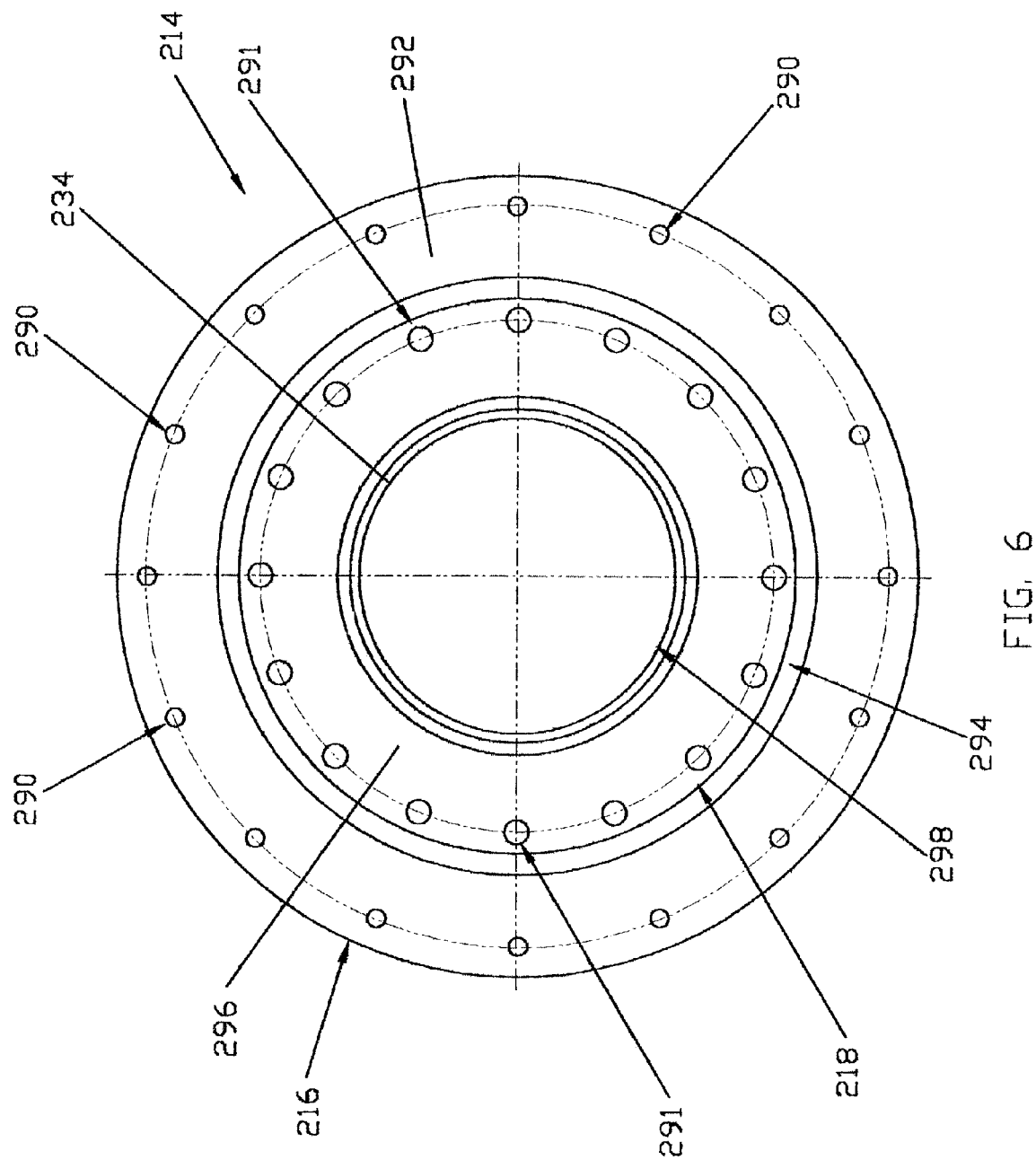
FIG. 6 is an end view of the bearing of a swivel assembly of the present invention.

As best shown in FIG. 6, the bearing 214 comprises the stationary bearing section 216 including an outer substantially circular ring 292 with the plurality of fastener channels 290 formed therethrough having a central disposed opening 294 to receive the rotatable bearing section 218 comprising an inner substantially circular ring 296 with the plurality of fastener channels 291 formed therethrough having a centrally disposed opening 298 to receive the exterior portion or segment 232 of the substantially cylindrical water conduit sleeve 230 therethrough and the inner flange 262 of the rotatable swivel member 258 therein.

In operation, mineral material is deposited in a stockpile on the edge of the slurry pit by a dragline or excavating equipment. Streams of high velocity water discharged from the barrels of the water guns are periodically directed to the base of the stockpile thereby causing mineral material on the edge of the stockpile to slough off into the slurry pit. By rotating the rotatable swivel sections and the corresponding rotatable bearing sections in the vertical and/or horizontal direction relative to the corresponding stationary swivel sections and the stationary bearing sections, an operator can control the motion of the barrel of the water guns to modulate the high velocity stream or liquid or water to slough off of the stockpile and into the slurry pit.

It will thus be seen that the objects set forth above, among those made apparent from the preceding description are efficiently attained and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A swivel assembly for use with a water gun coupled to a water supply conduit to discharge a stream of water comprising a stationary swivel section and a rotatably swivel section configured and disposed to operatively support a bearing including a stationary bearing section and a rotatable bearing section therebetween to facilitate rotation of the water gun relative to the water supply conduit to selectively control the direction of the high velocity stream of water relative to the mineral stockpile, wherein said stationary swivel section comprises a stationary swivel member including an outer body and an inner flange having a centrally disposed sleeve channel formed therethrough to operatively receive and support an interior segment of a substantially cylindrical water conduit sleeve therein and the wall thickness of said interior segment of said substantially cylindrical water conduit sleeve is greater than the wall thickness of said exterior segment of said substantially cylindrical water conduit sleeve forming a substantially circular shoulder at the intersection thereof, wherein said substantially cylindrical water conduit sleeve further includes an outer segment and said rotatable swivel section comprises a rotatable swivel member including a rotatable body having a reduced inner substantially cylindrical protrusion to receive said inner rotatable bearing section thereon and an enlarged outer flange having a centrally disposed channel formed therethrough to receive at least a portion of said outer segment of said substantially cylindrical water conduit sleeve and an inner wall of said centrally disposed channel includes a substantially circular shoulder to engage a portion of said exterior segment of said substantially cylindrical water conduit sleeve, further including at least one seal recess to receive and operatively retain a corresponding seal to seal against said outer surface of the exterior segment of said substantially cylindrical water conduit sleeve is formed in said centrally disposed channel, at least one O-ring groove to receive and operatively retain a corresponding O-ring to seal against said outer surface of said exterior segment of said substantially cylindrical water conduit sleeve is formed in said centrally disposed channel and an exterior O-ring groove is formed in the inner surface of said enlarged outer flange to receive a corresponding O-ring to seal against said stationary bearing section of said bearing when said swivel assembly is assembled.

2. The swivel assembly of claim 1 wherein the stationary swivel section comprises a stationary swivel member including an inner and outer surface having a centrally disposed channel formed therethrough to operatively receive and support an inner portion of a substantially cylindrical water conduit sleeve therein.

3. The swivel assembly of claim 2 further including a recess having a bearing support surface formed on said inner surface of said stationary swivel section to receive and support a portion of said rotatable bearing section therein.

4. The swivel assembly of claim 3 wherein said substantially cylindrical water conduit sleeve further includes an outer portion and said rotatable swivel section comprises a rotatable swivel member including an inner and outer surface having a centrally disposed channel including an inner channel surface formed therethrough to operatively receive and support an outer portion of said substantially cylindrical water conduit sleeve therein.

5. The swivel assembly of claim 4 wherein at least one seal recess is formed in said inner channel surface to operatively receive a corresponding seal therein disposed to engage and seal a portion of said outer portion of said substantially cylindrical water conduit sleeve.

6. The swivel assembly of claim 2 wherein said substantially cylindrical conduit sleeve further includes an outer portion and said rotatable swivel section comprises a rotatable swivel member including an inner and outer surface having a centrally disposed channel including an inner channel surface formed therethrough to operatively receive and support an outer portion of the substantially cylindrical water conduit sleeve therein.

7. The swivel assembly of claim 6 wherein at least one seal recess is formed in said inner channel surface to operatively receive a corresponding seal therein disposed to engage and seal a portion of said outer portion of the substantially cylindrical water conduit sleeve.

8. The swivel assembly of claim 1 wherein said substantially cylindrical water conduit sleeve is constructed of stainless steel secured to said stationary swivel member.

9. The swivel assembly of claim 1 further including a bearing recess having a bearing support surface formed on said inner surface of said inner flange of said stationary swivel member to receive and support said portion of said rotatable bearing section.

10. The swivel assembly of claim 1 wherein said stationary swivel member of said stationary swivel section is secured to a water supply conduit and said stationary bearing section of said bearing.

11. The swivel assembly of claim 1 wherein said enlarged outer flange of said rotatable swivel section is secured to a water supply conduit and said rotatable bearing section of said bearing.

12. A swivel assembly for use with a water gun coupled to a water supply conduit to discharge a stream of water comprising a stationary swivel section and a rotatably swivel section configured and disposed to operatively support a bearing including a stationary bearing section and a rotatable bearing section therebetween to facilitate rotation of the water gun relative to the water supply conduit to selectively control the direction of the high velocity stream of water relative to the mineral stockpile, said stationary swivel section comprises a stationary swivel member including an outer body and an inner flange having a centrally disposed sleeve channel formed therethrough to operatively receive and support an interior segment of a substantially cylindrical water conduit sleeve therein and said substantially cylindrical water conduit sleeve further includes an outer segment and said rotatable swivel section comprises a rotatable swivel member including a rotatable body having a reduced inner substantially cylindrical protrusion to receive said inner rotatable bearing section thereon and an enlarged outer flange having a centrally disposed channel formed therethrough to receive said outer segment of said substantially cylindrical water conduit sleeve, said stationary swivel member of said stationary swivel section is secured to a water supply conduit and said stationary bearing section of said bearing and said enlarged outer flange of said rotatable swivel section is secured to a water supply conduit and said rotatable bearing section of said bearing, including at least one seal recess to receive and operatively retain a corresponding seal to seal against said outer surface of the exterior segment of said substantially cylindrical water conduit sleeve formed in said centrally disposed channel and at least one O-ring groove to receive and operatively retain a corresponding O-ring to seal against said outer surface of said exterior segment of said substantially cylindrical water conduit sleeve formed in said centrally disposed channel including an exterior O-ring groove formed in said inner surface of said enlarged outer flange to receive a corresponding O-ring to seal against said stationary bearing section of said bearing when said swivel assembly is assembled.

13. The swivel assembly of claim 12 further including a pair of O-ring grooves to receive and operatively retain a corresponding O-ring to seal against said outer surface of said exterior segment of said substantially cylindrical water conduit sleeve formed in said centrally disposed channel on opposite side of at least one seal recess to receive and operatively retain a corresponding seal to seal against said outer surface of the exterior segment of said substantially cylindrical water conduit sleeve formed in said centrally disposed channel.

14. The swivel assembly of claim 13 further including an exterior O-ring groove formed in said inner surface of said enlarged outer flange to receive a corresponding O-ring to seal against said stationary bearing section of said bearing when said swivel assembly is assembled.

15. The swivel assembly of claim 14 further including a bearing recess having a bearing support surface formed on said inner surface of said inner flange of said stationary swivel member to receive and support a portion of said rotatable bearing section.

16. The swivel assembly of claim 12 further including a bearing recess having a bearing support surface formed on said inner surface of said inner flange of said stationary swivel member to receive and support a portion of said rotatable bearing section.

17. The swivel assembly of claim 12 wherein said inner wall of said centrally disposed channel includes a shoulder to engage a portion of said exterior segment of said substantially cylindrical water conduit sleeve.

18. A swivel assembly for use with a water gun coupled to a water supply conduit to discharge a stream of water comprising a stationary swivel section and a rotatably swivel section configured and disposed to operatively support a bearing including a stationary bearing section and a rotatable bearing section therebetween to facilitate rotation of the water gun relative to the water supply conduit to selectively control the direction of the high velocity stream of water relative to the mineral stockpile, said stationary swivel section comprises a stationary swivel member including an outer body and an inner flange having a centrally disposed sleeve channel formed therethrough to operatively receive and support an interior segment of a substantially cylindrical water conduit sleeve therein and said substantially cylindrical water conduit sleeve further includes an outer segment and said rotatable swivel section comprises a rotatable swivel member including a rotatable body having a reduced inner substantially cylindrical protrusion to receive said inner rotatable bearing section thereon and an enlarged outer flange having a centrally disposed channel formed therethrough to receive said outer segment of said substantially cylindrical water conduit sleeve, said stationary swivel member of said stationary swivel section is secured to a water supply conduit and said stationary bearing section of said bearing and said enlarged outer flange of said rotatable swivel section is secured to a water supply conduit and said rotatable bearing section of said bearing and a pair of O-ring grooves to receive and operatively retain a corresponding O-ring to seal against said outer surface of said exterior segment of said substantially cylindrical water conduit sleeve formed in said centrally disposed channel on opposite side of at least one seal recess to receive and operatively retain a corresponding seal to seal against said outer surface of the exterior segment of said substantially cylindrical water conduit sleeve formed in said centrally disposed channel.

19. The swivel assembly of claim 18 including at least one seal recess to receive and operatively retain a corresponding seal to seal against said outer surface of the exterior segment of said substantially cylindrical water conduit sleeve formed in said centrally disposed channel and at least one O-ring groove to receive and operatively retain a corresponding O-ring to seal against said outer surface of said exterior segment of said substantially cylindrical water conduit sleeve formed in said centrally disposed channel.

20. The swivel assembly of claim 19 further including an exterior O-ring groove formed in said inner surface of said enlarged outer flange to receive a corresponding O-ring to seal against said stationary bearing section of said bearing when said swivel assembly is assembled.

* * * * *